United States Patent

[11] 3,577,769

| [72] | Inventor | John Alfred Roberts |
| | | Lynnfield Center, Mass. |
| [21] | Appl. No. | 812,710 |
| [22] | Filed | Apr. 2, 1969 |
| [45] | Patented | May 4, 1971 |
| [73] | Assignee | General Electric Company |

[54] LEAK-DETECTION SYSTEM
10 Claims, 4 Drawing Figs.

[52] U.S. Cl. ................................................. 73/40.7
[51] Int. Cl. ................................................. G01m 3/20
[50] Field of Search .......................................... 73/40.7,
49.3; 23/(Inquired); 340/242

[56] References Cited
UNITED STATES PATENTS
3,027,753  4/1962  Harder, Jr. .................. 73/40.7
3,186,214  6/1965  Roberts ....................... 73/40.7

Primary Examiner—Louis R. Prince
Assistant Examiner—William A. Henry, II
Attorneys—Frank L. Neuhauser, Oscar B. Waddell, Joseph B. Forman, William S. Wolfe and Gerald R. Woods ABSTRACT: Leak-detecting apparatus having an enclosure for a container to be tested providing a sample gas accumulator. The container is charged with a tracer gas which in the case of a leak, flows into the accumulator from which it is pumped through a sample gas conduit to a gas sensor sensitive to the tracer gas. The sensor activates valves to supply a purging gas to the sample gas conduit to purge the sensor thereby cutting of all flow of tracer gas to the sensor. This occurs before saturation of the sensor thereby preventing saturation with the resultant long recovery time.

Patented May 4, 1971

INVENTOR.
JOHN A. ROBERTS

BY George A. Hirster
ATTORNEY.

INVENTOR.
JOHN A. ROBERTS

BY George A. Herbster
ATTORNEY.

LEAK-DETECTION SYSTEM

BACKGROUND OF THE INVENTION

The present invention relates to a leak-detection system for detecting leakage of fluid from sealed containers. The system has particular application to apparatus used for detecting leakage from containers such as refrigeration coils, compressors, pressurized dispensers of fluids, etc., as they pass through a factory production line. Such testing is performed at a leak test station where the containers are individually tested for total leakage and accepted or rejected depending on the results of the test.

Leak-detecting apparatus of the type referred to above typically comprises as enclosure for the container to be tested providing a sample gas accumulator. To detect total leakage, the container is charged with a tracer gas which, in the case of a leak, flows into the accumulator from which it is pumped to a gas sensor sensitive to the tracer gas. The sensor is calibrated to indicate whether any detected leakage is beyond the established limits. For some applications as where the container is made to store poisonous or explosive fluids, very small leaks must be detected (e.g. concentrations in the parts-per-billion range) and this requires a vary sensitive gas sensor. One type of sensor having the required sensitivity is the halogen leak detector such as shown and described in U.S. Pat. No. 3,483,359 issued Dec. 9, 1969 and assigned to the same assignee as the present invention (presently Pat. application Ser. No. 694,604, filed Dec. 29, 1967). While such a sensor has the required sensitivity, problems arise in adapting it for production leak testing because of a relatively long recovery time required between tests due to inherent operating characteristics of high-sensitivity sensors. One such characteristic is that the calibration of the sensor is affected by changes or pulses in the gas flow rate therethrough which affects the heat balance of the heated ion-producing electrodes controlling the flow of current indicative of concentration of the tracer gas. Such flow rate changes or pulses are likely to occur, for example, when control valves are operated to couple and decouple the sensor between tests. This requires a long wait period to reestablish equilibrium conditions. Another such characteristic is that exposure of the sensor to a high concentration of tracer gas, as may occur with a substantial leak, will saturate and desensitize the sensor and when this occurs a long waiting time is required before the sensor recovers its normal sensitivity. Thus the inherent characteristics of the high-sensitivity sensor tend to slow down the testing rate. This multiplies the number of leak test stations required for a given test rate with concomitant increase in cost.

Accordingly, it is an object of the present invention to provide a leak-detection system utilizing a high-sensitivity gas sensor which substantially eliminates the waiting period between tests for recovery of the sensor thereby greatly increasing the speed of the testing operation.

A further object of the invention is to provide a leak detection system which prevents saturation of the sensor in the event of a substantial leak.

A still further object of the invention is to provide a leak-detection system having a gas sensor in which either a purging gas or a sample gas may be switched to the sensor without changing the gas flow rate and calibration of the sensor.

Further objects and advantages of the invention will become apparent as the following description proceeds.

SUMMARY

Briefly, in accordance with the invention there is provided a leak test system comprising an accumulator adapted to enclose a container to be tested which is charged with a tracer gas. Sample gas is pumped at a constant rate from the accumulator to a gas sensor sensitive to the tracer gas through a sample gas conduit. During a standby period for loading and unloading of the test container purging gas is supplied to the inlet of the sample gas conduit at a rate greater than the aforesaid pumping rate so that only purging gas reaches the sensor. During the sampling period when the accumulator is closed the supply of purging gas is cut off so that sample gas is pumped from the accumulator to the sensor which indicates any leakage of tracer gas. In the event of a leak, the sensor activates valves to supply the purging gas to the sample gas conduit to purge the conduit of tracer gas and also directly to the sensor thereby cutting off all flow of tracer gas to the sensor. This occurs before saturation of the sensor thereby preventing saturation with the resulting long recovery time. To prevent fluctuations or pulses in the sensor gas flow rate due to valving of the purging and sample gas, a sample gas chamber is interposed in the sample gas conduit between the accumulator and the sensor to which gas is supplied at a rate greater than the aforesaid pumping rate with the excess flow being vented from the sample chamber. This prevents gas flow transients due to valving from reaching the sensor and affecting its calibration.

For a better understanding of the invention reference should be made to the following detailed description taken in connection with the accompanying drawings.

DESCRIPTION OF ILLUSTRATIVE EMBODIMENTS

Figure 1:
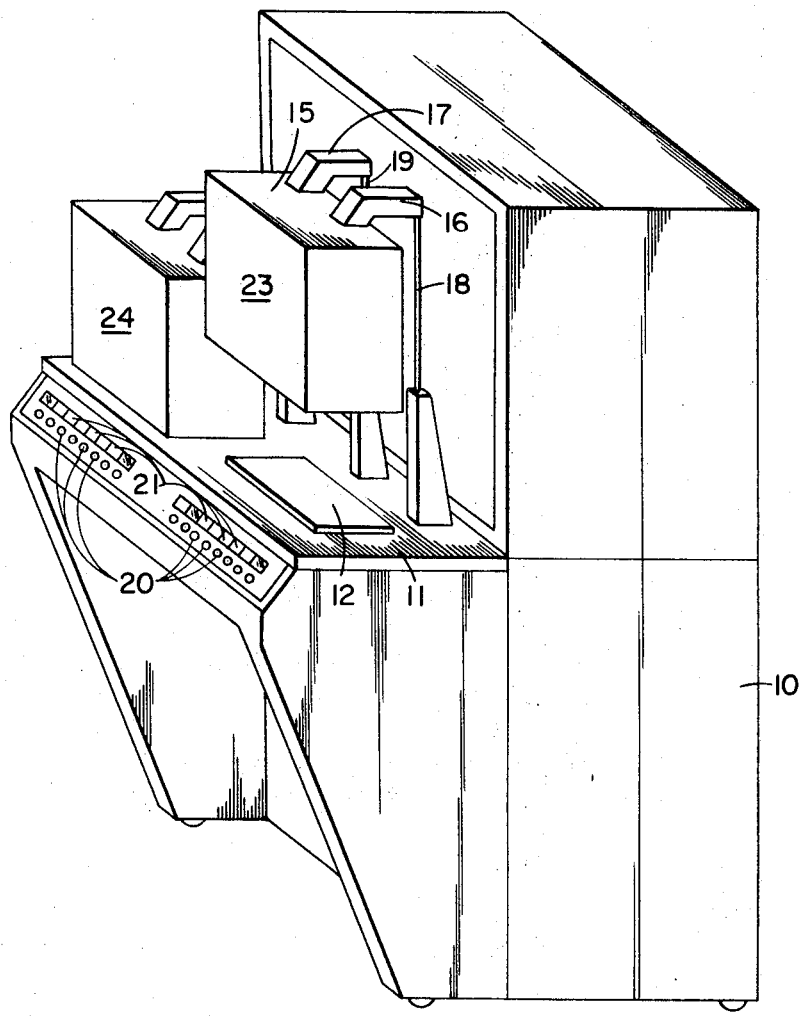
FIG. 1 is a perspective view of a leak test station used for production leak testing of sealed containers to which the sampling and control system of the present invention may be applied.
Figure 2:
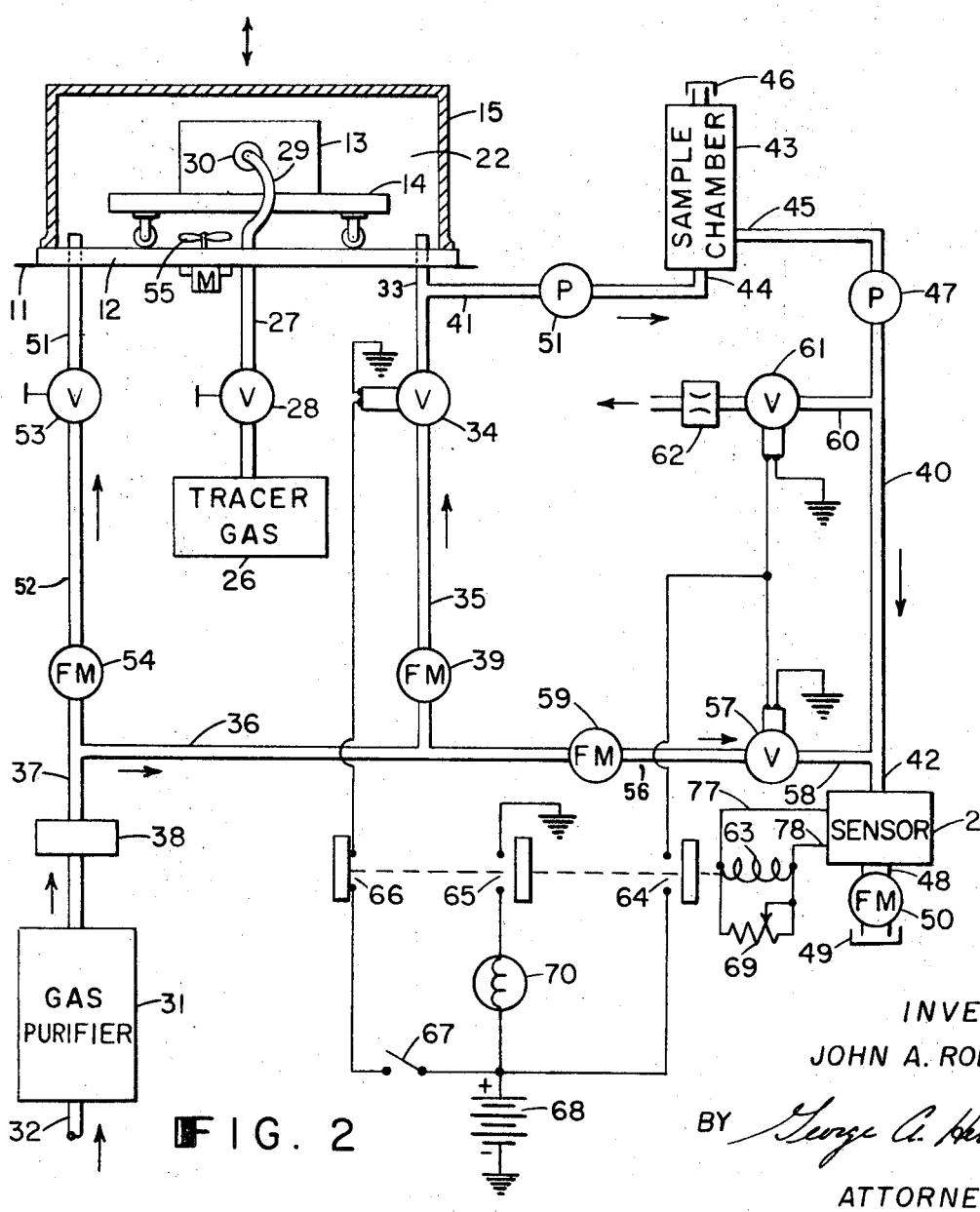
FIG. 2 is a schematic diagram showing how the various components of the leak-detection system are interconnected.

Referring to FIGS. 1 and 2 of the drawing, there is shown a leak test station suitable for production leak-testing of sealed containers. The station may, for example, be installed adjacent to a conveyor in a factory production line. As shown the leak test station comprises a console 10 having a front table 11 with a platform 12 on which an operator places a sealed container 13 to be leak tested. A dolly 14 may be used to move the container into position and support it during the test. A vertically movable cover or hood 15 is supported over platform 12 by brackets 16 and 17 mounted on rods 18 and 19 which are moved vertically by a suitable servomotor (not shown) located beneath the table 12. The testing operation is controlled by pushbuttons 20 and various conditions such as START, ACCEPT, REJECT, etc. are indicated by indicator lights 21 located on the front of the console 10. After the container 13 is placed in position on platform 12 the operator pushes a control button to lower the hood 15 onto platform 12 to form a closed accumulator 22 for sample gas to be tested for leakage from the container. FIG. 1 shows a double unit wherein the control equipment is duplicated in a side-by-side arrangement so that the operator can load one unit designated generally by number 23 while a test is being conducted in the second unit designated generally by number 24. The subsequent description will refer only to unit 23 it being understood that the operation of unit 24 is identical.

Referring now particularly to FIG. 2 of the drawing, the leak-detection system utilizes a high-sensitivity gas sensor 25 which detects leakage of tracer gas from the sealed container to be tested. Preferably, the sensor 25 is a known type of halogen leak detector which provides an output signal in the form of an electrical current when a tracer gas containing a halogen or halogen compound passes through it. The output current varies with the concentration of the tracer gas and will respond to concentrations as small as one part per billion. For some leak-testing applications, the sealed container 13 may already be charged with a substance containing a halogen compound such as dichlorodifluoromethane (R-12) in which case it is unnecessary to add a tracer gas to the container for leak testing. In other applications, as when the container is empty at the time of the test, it is necessary to charge the container with a tracer gas to which the sensor 25 is sensitive. For this purpose there is provided a tank 26 containing a tracer gas under pressure which may be, for example, a mixture of air and a halogen compound such as dichlorodifluoromethane. The tracer gas is supplied to the container 13 through a conduit 27 controlled by a valve 28. Typically, the conduit 27 extends upwardly through the platform 12 and has at the end a flexible section 29 adapted to be connected to a fitting 30 extending inside the container 13 by a gas tight connection. While the cover 15 is open the operator connects the flexible section 29 to the container and charges it with tracer gas by opening valve 28.

Before any leak testing can be performed the atmosphere in accumulator 22 must be purged of any residual tracer gas or any ambient atmosphere contaminated by a halogen. For this purpose there is provided a source of purified, halogen-free purging gas under pressure. This source may be, for example, a tank 31 containing activated charcoal through which compressed air is passed from a supply line 32. As used herein, purging gas means gas from which any halogen compound has been removed so that when the purging gas passes through the sensor 25, the sensor does not respond with a change in its output signal. Purging gas is supplied to accumulator 22 through a conduit 33 extending upwardly through platform 12 into the accumulator. The conduit 33, which is controlled by an electromagnetically operated, normally open valve 34, is connected to purging gas source 31 by conduits 35, 36, and 37. A pressure regulator 38 maintains the purging gas pressure at a constant value and gas flow rate, as may be conveniently read by a flowmeter 39 in the conduit 35, is set to a desired value by adjustment, in any suitable manner, of the flow impedance of the conduit 33.

Sample gas to be tested flows from the accumulator 22 to the sensor 25 through a sample gas conduit 40 having an inlet end 41 coupled to conduit 33 adjacent the accumulator and an outlet end 42 couples to the sensor 25. As used herein, sample gas means gas in accumulator 22 which flows to sensor 25 through sample gas conduit 40 for test purposes, which gas may or may not include a halogen depending on whether or not tracer gas passes into accumulator 22 by way of a leak in container 13.

In order to cause sample gas to flow from accumulator 22 to sensor 25 at a constant rate free of pulsations as might be caused by operation of control valves, there is provided a pumping system which will now be described. Interposed in the sample gas conduit 40 between the inlet end 41 and the outlet end 42 is a sample gas accumulator tank or chamber 43 having an inlet 44, an outlet 45 and a vent 46 open to the atmosphere. Sample gas is pumped from the outlet 45 of the sample gas chamber to the sensor 25 by means of pump 47 which has a constant pumping rate. Sample gas so pumped leaves the sensor 25 by way of a conduit 48 and is vented to the atmosphere through a vent 49. The pumping rate of pump 47 is adjusted to a desired constant value, as read by a flowmeter 50 in conduit 48, in any suitable manner (not shown). Sample gas is pumped from accumulator 22 through conduit 33 and inlet 41 of sample gas conduit 40 to the sample chamber 43 by means of a second pump 51. The pumping rate of pump 51 is adjusted in any suitable manner (not shown) to be greater than the pumping rate of pump 47 so that there is always excess gas passing out through vent 46. The flow rate of purging gas through conduit 35 when valve 34 is open is adjusted so that it is greater than the pumping rate of pump 51 with the excess purging gas flowing into accumulator 22. With this arrangement, it will be apparent that when valve 34 is open, purging gas will be supplied to accumulator 22 through conduit 33 and also to sensor 25 through conduit 40. When valve 34 is closed pumps 51 and 47 will pump sample gas from accumulator 22 to sensor 25 through sample gas conduit 40. Thus the valve 34 is a control means for controlling the flow of either purging gas or sample gas to the sensor 25. Because pump 47 pumps at a constant rate less than the rate of pump 51, the sensor 25 receives gas at a constant rate, the flow being relatively insensitive to pulsations in flow as may be caused by operation of valve 34. This prevents calibration errors or output changes in sensor 25 with resulting inaccuracy which would otherwise occur due to change in the heat balance of the ion-producing electrodes of the sensor as will be further explained.

For some applications, especially where the volume of the accumulator 22 is large to accommodate large sealed containers to be tested, the flow of purging gas through conduit 33 may not be adequate to purge the accumulated tracer gas. For such applications an additional purging gas conduit 51 may be provided for supplying purging gas to the accumulator from source 31 through conduit 52 controlled by manually adjusted valve 53. The rate of the supplemental purging gas flow may be conveniently read out by a flowmeter 54 in conduit 52. If desired, circulation of the gas in accumulator 22 may be augmented by a motor-driven fan 55 to insure that a uniform sample is pumped to sensor 25.

For the purpose of preventing saturation of the sensor 25 by the tracer gas and to provide means for indicating a leak, there is provided an automatic indication and control system which will now be described. In the event of a leak in container 13, as detected by sensor 25, purging gas from source 31 is supplied immediately to the sensor through a conduit 36, a normally closed electromagnetic valve 57 and a conduit 58 coupled to the outlet 42 of the sample gas conduit 40. The rate at which purging gas flows through conduit 58 when valve 57 is open, as read out by a flowmeter 59, is adjusted by any suitable means (not shown) to be greater than the flow rate through sensor 25. The excess purging gas thus flows back through sample gas conduit 40 and is vented to the atmosphere through an exhaust conduit 60 controlled by a normally closed electromagnetic valve 61. At the same time valve 34 is opened so that purging gas enters inlet 41 of the sample gas conduit, pump 51, sample chamber 43, pump 47 and out the exhaust conduit 60. To insure this flow distribution a restriction 62 is placed in the exhaust line 60 to provide the required flow impedance. Thus at the time purging gas is supplied directly to the sensor 25, the sample gas conduit 40 is purged of residual tracer gas from both ends so that no more tracer gas will enter the sensor prior to the next test. To accomplish this action automatically, there is provided a leak relay 63 energized by the sensor output at a level below the saturation level as will be described. The relay has two normally open sets of contacts 64 and 65 and a set of normally closed contacts 66. When a sample switch 67 is closed, a circuit is completed from a power supply 68 through contacts 66 to energize the operating solenoid of valve 34 causing the valve to close and start the flow of sample gas from the accumulator 22 to the sensor 25 through sample gas conduit 40. If a leak occurs it is detected by sensor 25 causing an increase in its output signal whereupon relay 63 is energized. Contacts 64 close energizing and opening the valves 57 and 61 and contacts 66 open deenergizing and opening valve 34. This causes purging gas to be supplied directly to the sensor and to both ends of the sample gas conduit 40 to purge residual tracer gas through exhaust conduit 60. At the same time contacts 65 close completing an energizing circuit to signal lamp 70 thus providing an indication that a leak exists in container 13.

Figure 3:
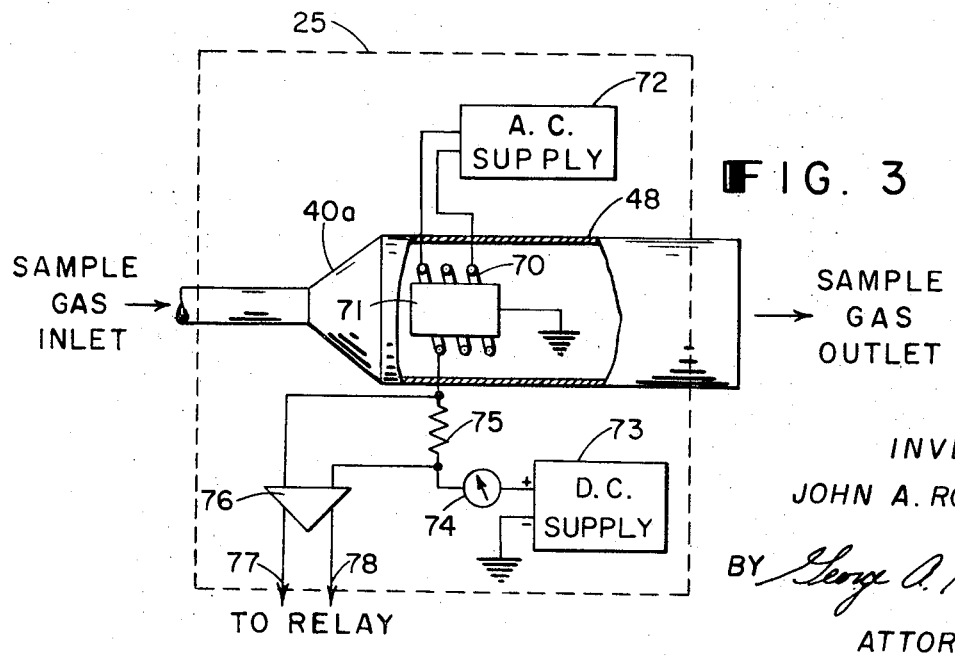
FIG. 3 shows certain constructional details of the gas sensor forming a part of the system of FIG. 2.

A suitable arrangement for providing an output signal from the sensor 25 to operate the leak relay is shown in FIG. 3. The halogen sensor, in the form illustrated, has an ion-emitting electrode 70 in the form of a helix surrounding and spaced from an ion-collecting electrode 71, the ion-emitting electrode 70 being electrically heated by current from an AC supply 72. The positive side of a DC supply is connected to electrode 70 through a meter 74 and a resistor 75, the negative grounded side of the DC power supply being connected to the ion-collecting electrode 71. Sample gas entering through sample gas conduit 40 enters a diffuser 40a and then flows between electrodes 70 and 71 leaving the sensor through conduit 48. The conduit 40 has a smaller diameter than the conduit 48 so as to increase the velocity of gas flow to the sensor from accumulator 22 and thereby decrease the response time. This construction is disclosed and claimed in U.S. Pat. No. 3,071,722 issued Jan. 1, 1963 and assigned to the same assignee as the present invention.

Figure 4:
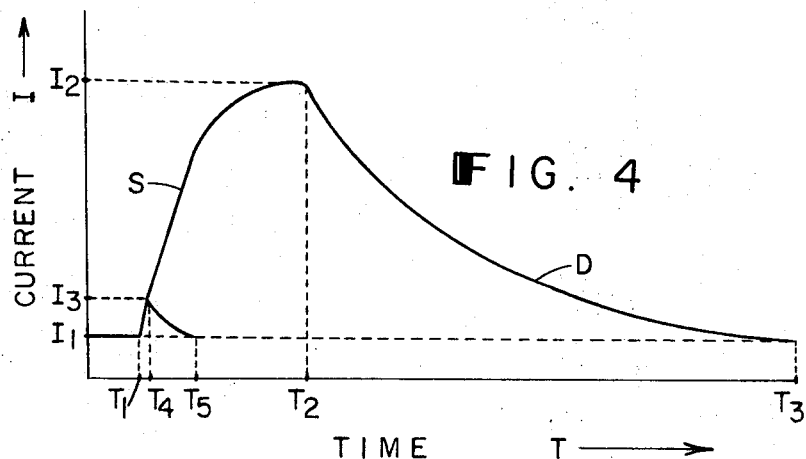
FIG. 4 is a graphical representation showing the saturation effect in the gas sensor which is useful in explaining the operation of the invention.

The halogen sensor is characterized by the fact that when the gas flowing between the electrodes contains a halogen or halogen compound ions are formed at the ion-emitting positive electrode 70. The ions are attracted to the negatively charged electrode 71 causing a DC current to flow which is indicated by the meter 74. The magnitude of the current flow varies with the degree of concentration of the halogen in the operating range of the sensor beyond which the sensor saturates. This saturating characteristic is illustrated in FIG. 4 which shows how the sensor output current varies when the sensor is exposed to progressively increasing concentration of halogen sufficient to cause saturation. When the sample gas contains no halogen; i.e., no tracer gas is present, the sensor current is at a low background level $I_1$. When a progressively increasing concentration of tracer gas appears in the sample gas at a time $T_1$ the sensor current I rises rapidly along a curve S to a saturated level $I_2$ at a time $T_2$. If purging gas free of halogen or tracer gas is now supplied to the sensor, the output current I will gradually decay along a curve D until it eventually returns to the initial level $I_1$ at a time $T_3$. The time interval $T_3-T_2$ for the sensor to return to its initial state may be of the order of 4 or 5 minutes. If saturation of the sensor is permitted to occur this time lag would obviously slow down the testing rate since the sensor must return to its initial state before another test can be made. Saturation of the sensor is prevented by adjusting the leak relay so that it operates at a current output level $I_3$ which is substantially below the saturating level $I_2$. As will be noted this reduces the time interval for the sensor output current level to drop to the initial level $I_1$ to a short interval $T_5-T_4$ which is of the order of a few seconds. The relay 63 is energized to pick up in response to an increase in the output of the sensor above the initial level $I_1$. For this purpose an amplifier 76 is used with its input connected across the resistor 75 and its output connected to the relay coil through leads 77 and 78. Since the voltage drop across resistor 75 is proportional to the sensor output, the relay current will also be proportional. By adjusting the potentiometer 69 shunting the relay coil, the relay may be made to pick up at the desired output current level of the sensor such as $I_3$.

OPERATION

The operation of the leak-testing system of the present invention may now be summarized. When cover 15 is open, the operator places a container 13 to be tested on platform 12 and attaches the tracer gas connection 29 if the container is not already charged with a tracer gas. The cover is then closed with sample switch 67 open so that the purging gas from source 31 is supplied to accumulator 22 through open valve 34. Valve 28 is then opened to charge the container with tracer gas from tank 26. Sample switch 67 is then closed closing valve 34 whereby sample gas is pumped from accumulator 22 to sensor 25 through conduit 40. At this time leak relay 63 is deenergized, valves 61 and 57 are closed and leak-indicating signal lamp 70 is deenergized. If there is no leak in container 13 the output current of sensor 25 will not change and relay 63 will not pick up. After a predetermined interval as may be indicated by a timer (not shown) the operator is advised that there is no leak. He then raises the cover 15, opens switch 67 whereby valve 34 opens and supplies purging gas to the accumulator area to remove any residual tracer gas when a connection 29 is detached to remove container 13. Additional purging gas may also be supplied through conduit 51 as explained above.

If a leak occurs during a test the sensor output current will rise to a preset level $I_3$ causing relay 63 to pick up closing contacts 64 and 65 and opening contacts 66. This causes valve 57 to open immediately supplying purging gas to the sensor thereby preventing saturation of the sensor. Valves 61 and 34 also open so that purging gas enters both ends of sample gas conduit 40 to remove residual tracer gas which is vented through exhaust conduit 60. Signal lamp 70 also lights providing a REJECT signal notifying the operator that the container leaks and should be rejected. When the sensor current returns to the initial level $I_1$ the leak relay drops out whereby valves 57 and 61 are closed and valve 34 is opened. The operator then opens sample switch 67, raises cover 15 and removes the container 13 to be rejected. Purging gas is again supplied to the accumulator and the sensor and the equipment is ready for the next test.

From the foregoing it will be seen that the pumping system described isolates the sensor from the flow rate changes and pulses during the valving operations whereby the heat balance of the sensor electrodes 70 and 71 is not affected. This eliminates a long waiting period for equilibrium flow conditions to occur prior to making each test. Also, by immediately cutting off the flow of tracer gas to the sensor as soon as a leak is detected, saturation of the sensor is prevented. This avoids the need for waiting a relatively long time for the sensor to return to normal prior to the next test. Thus the leak test system of the present invention greatly speeds up the testing rate and thereby improves the efficiency of the testing equipment.

While there has been described and shown in FIGS. 1, 2, and 3 of the drawing what is considered to be a preferred embodiment of the invention, it will be apparent to those skilled in the art that various changes and modifications may be made therein without departing from the spirit and scope of the invention.

I claim:

1. A leak-detection system for detecting leakage of a tracer gas from a container comprising:
   a. an enclosure for the container forming an accumulator for sample gas,
   b. a sensor responsive to flow of the tracer gas therethrough for producing an output signal variable in accordance with the concentration of said tracer gas,
   c. a sample gas conduit having an inlet coupled to said accumulator and an outlet coupled to said sensor,
   d. control means for controlling the flow of sample gas from said accumulator to said sensor through said conduit,
   e. means actuating said control means to initiate a flow of sample gas through said conduit to said sensor,
   f. and means responsive to a predetermined output signal level from said sensor below a saturation level for actuating said control means to stop the flow of sample gas through said conduit to said sensor to prevent saturation of said sensor.

2. A leak-detection system as recited in claim 1 including leak-indicating means actuated by said sensor when its signal output reaches said predetermined level.

3. A leak detector system as recited in claim 1 wherein the control means comprises:
   a. means for pumping gas through said sample gas conduit to the sensor at a constant pumping rate,
   b. and means for supplying a purging gas to the inlet of the sample gas conduit at a rate greater than said constant pumping rate so as to preclude flow of sample gas from said accumulator to said sensor.

4. A leak detection system as recited in claim 1 wherein the control means comprises:
   a. a source of purging gas free of said tracer gas,
   b. a purging gas conduit coupling said source to the sample gas conduit, and
   c. valve means for controlling the flow of purging gas through said purging gas conduit.

5. A leak-detection system as recited in claim 1 wherein the control means comprises:
   a. a source of purging gas free of said tracer gas, b. a first purging gas conduit controlled by a first valve coupling said source to the inlet of the sample gas conduit, c. a second purging gas conduit controlled by a second valve for coupling said source to the outlet end of the sample gas conduit, d. an exhaust vent coupled to the sample gas conduit between the inlet and outlet ends controlled by a third valve, e. a signal responsive means for jointly operating said first, second and third valves.

6. A leak-detection system for detecting leakage of a tracer gas from a container comprising:

a. an enclosure for the container forming a gas accumulator, b. a sensor responsive to flow of said tracer gas therethrough and producing an output signal in response thereto, the calibration of said sensor being sensitive to changes in gas flow rate therethrough, c. a sample gas conduit having an inlet coupled to said accumulator and an outlet coupled to said sensor, d. an enclosure forming a sample gas chamber connected to said sample gas conduit between the inlet and outlet ends thereof, said chamber having a vent, e. a first pumping means for pumping gas from said sample chamber through said sample gas conduit to said sensor at a constant rate, f. a second pumping means for pumping gas to the sample chamber from the inlet of the sample gas conduit at a pumping rate greater than the pumping rate of the first pumping means, excess gas leaving said sample chamber through said vent, g. means comprising a purging gas conduit controlled by a valve for supplying a purging gas to the inlet of said sample gas conduit at a rate greater than the pumping rate of the second pumping means whereby purging gas is pumped to the sensor with excess entering the accumulator when said valve is open and sample gas is pumped from said accumulator to said sensor when said valve is closed, and h. means for operating said valve to control the flow of purging gas and sample gas to said sensor, the gas flow rate and hence the calibration of said sensor being unaffected by the operation of said valve.

7. A leak-detection system as recited in claim 6 including:

a. means for closing the valve to pump sample gas from the accumulator to the sensor, and b. control means responsive to an output signal from the sensor for automatically opening the valve when leakage of the tracer gas from the container into the accumulator is detected by the sensor.

8. A leak-detection system as recited in claim 7 including leak-indicating means which is also actuated by the output signal from the sensor.

9. A leak-detection system as recited in claim 6 including:

a. a second purging gas conduit controlled by a valve for supplying purging gas to the outlet of the sample gas conduit, b. an exhaust vent controlled by an exhaust valve coupled to said sample gas conduit between the first pumping means and the outlet end, and c. means for operating the purging gas valves and the exhaust valve jointly to purge tracer gas from the sample gas conduit.

10. A leak-detection system comprising:

a. an accumulator adapted to enclose a container to be leak tested, b. a sensor for detecting gas leaking from the container, c. a sample gas conduit coupling said accumulator to said sensor, d. pumping means for pumping gas through said sample gas conduit to said sensor at a constant pumping rate, e. means including a purging gas conduit controlled by a valve for supplying purging gas to the inlet of said sample gas conduit at a rate greater than said pumping rate, f. means including said last-mentioned means for pumping the purging gas to the sensor with excess entering the accumulator when the valve is open and for pumping the sample gas from the accumulator to the sensor by the pumping means when the valve is closed.